United States Patent [19]
Eide et al.

[11] 3,783,374
[45] Jan. 1, 1974

[54] CAPACITANCE DIFFERENCE DETECTOR CIRCUIT

[75] Inventors: Melvin O. Eide, Bellevue; Donald E. Clark, Redmond, both of Wash.

[73] Assignee: Sundstrand Data Control, Inc., Redmond, Wash.

[22] Filed: Apr. 7, 1972

[21] Appl. No.: 242,082

[52] U.S. Cl. .......... 324/60 C, 318/662, 324/60 CD, 324/61 R, 324/DIG. 1, 340/200
[51] Int. Cl. ...................... G01r 11/52, G01r 27/26
[58] Field of Search .................... 324/60 C, 60 CD, 324/60 R, 61 R, DIG. 1; 318/662; 340/200; 73/304 C

[56] References Cited
UNITED STATES PATENTS

| | | | |
|---|---|---|---|
| 2,548,790 | 4/1951 | Higinbotham et al. | 340/200 |
| 3,435,317 | 3/1969 | Osborn | 340/200 X |
| 3,318,153 | 5/1967 | Lode | 324/61 R X |
| 2,968,031 | 1/1961 | Higa | 324/61 R X |
| 2,811,697 | 10/1957 | Hogan | 324/61 R X |
| 2,820,987 | 1/1958 | Bunch | 324/61 R |
| 3,109,939 | 11/1963 | Chin et al. | 324/DIG. 1 |
| 3,302,459 | 2/1967 | Isoda et al. | 324/61 R X |
| 3,421,059 | 1/1969 | Takahashi | 318/662 |

*Primary Examiner*—Stanley T. Krawczewicz
*Attorney*—Ernest A. Wegner et al.

[57] ABSTRACT

A circuit for detecting or sensing the ratio of or unbalance between two impedance elements, as the sections of a differential capacitor in a servoed instrument. A source of alternating current has two outputs of opposite phase, one connected in each of a pair of circuits with the two impedance elements. A diode in each of the circuits is poled so that both circuits conduct during the same half cycle. A load connected with both circuits sums the opposite phase currents and the difference between the currents represents the ratio of the impedance elements.

9 Claims, 5 Drawing Figures

OUTPUT CURRENT

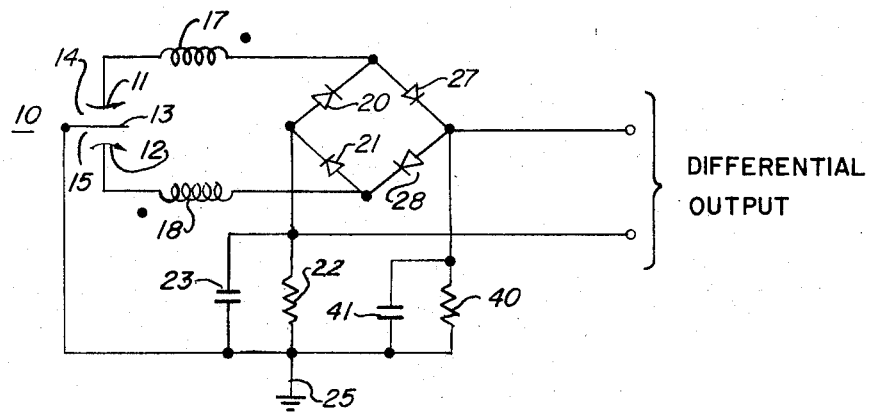
FIG. 3
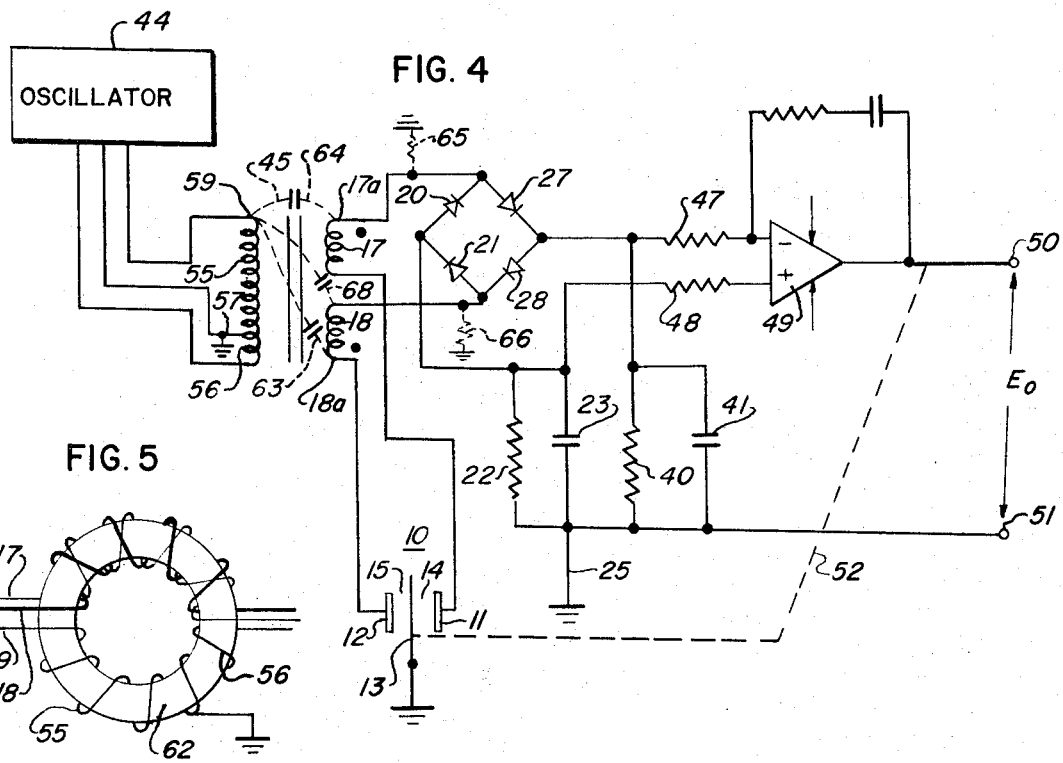
FIG. 4
FIG. 5

CAPACITANCE DIFFERENCE DETECTOR CIRCUIT

It is a common practice to detect or measure a physical condition by its effect on an electrical sensor or transducer. Circuitry for translating the effect on the sensor into a current or voltage, in situations requiring a high degree of accuracy and reliability, often uses a form of diode bridge in which the output is a function of the difference between or ratio of two impedance elements, one or both of which is varied in accordance with the physical condition to be measured. A differential capacitor having two sections, one increasing in capacity as the other decreases, is often used as the impedance element which responds to the condition to be measured. Examples of such detector circuits are found in Sippach U.S. Pat. Nos. 2,766,428, Lion 3,012,192, Lode 3,318,153 and Eide 3,688,206 and assigned to the assignee of this application. In each of the circuits of these prior patents and application, the output signal is established as the difference between currents flowing in the circuits during alternate half cycles. Such detectors provide accurate results so long as the waveform of the exciting voltage is symmetric or identical on alternate half-cycles. From a practical standpoint, this requires sophisticated and expensive oscillator circuitry in order to maintain symmetric waveforms, particularly where the circuit must operate over an extended temperature range. In addition, previous bridge circuits have required the use of matched diodes which increase the cost.

In accordance with the present invention, it is a principal feature of the detector that it has two circuits energized from an alternating source with two outputs which are 180° out of phase. The two impedance elements are connected in the circuits with the source outputs and through diodes with a common load. The circuits conduct at the same time, but the currents flow in opposite directions and are summed in the load, with the difference current representing the unbalance or difference between the impedance elements.

More specifically, the source preferably includes a transformer having an output transformer with a pair of identical windings, one of the windings being connected with each of the circuits.

Another feature is that the impedance elements are reactive and the detector circuit further includes a second pair of diodes connected with the source and impedance elements and conductive during the half-cycle when the current is not conducted through the load, to discharge and recharge the impedance elements in the opposite sense.

A further feature is that a second load is connected with the second pair of diodes to sum the current through them and an output circuit is connected across both loads.

Yet another feature is that the time constant of the circuit of each of the reactive impedance elements and the load is less than the period of the alternating current source.

Further features and advantages of the invention will readily be apparent from the following specification and from the drawings, in which:

FIG. 3 is a schematic diagram of another embodiment of the detector circuit with dual loads;

FIG. 4 is a schematic diagram of the detector circuit connected with a differential amplifier in a servoed measuring system; and FIG. 5 is a sketch illustrating a preferred transformer winding relationship.

The detector disclosed and claimed herein may be used with either resistive or reactive impedances to measure a displacement of one element with respect to another. A common use is the measurement of force in a servoed accelerometer, utilizing a differential capacitor impedance element. Systems of this character are shown in the aforementioned patents and in Thompson U.S. Pat. Nos. 3,678,374, and Jacobs 3,702,073, both assigned to the assignee of this application. Other uses of the detector in electrically sensing position or movement will readily be apparent.

Figure 1:
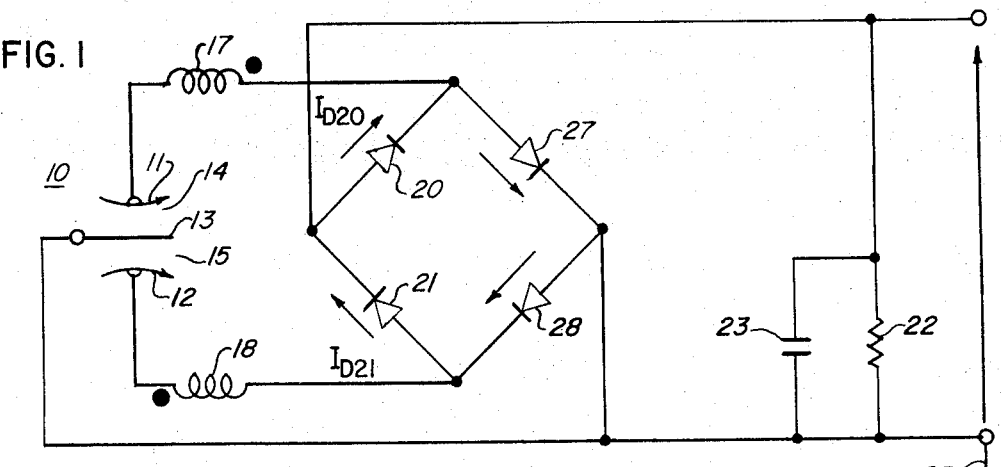
FIG. 1 is a schematic diagram of an embodiment of the invention.

In FIG. 1, a differential capacitor 10 has a pair of fixed plates 11 and 12 and a movable plate 13 which responds mechanically to the condition being sensed. Movable plate 13 forms a first capacitor 14 with fixed plate 11 and a second capacitor with fixed plate 12. Movement of plate 13 toward plate 11 increases the capacity of capacitor 14 and decreases the capacity of capacitor 15. Movement of plate 13 toward plate 12 has the opposite effect.

An alternating current source, as an oscillator, has two output windings 17 and 18, which may be secondary windings of a coupling transformer. The first of a pair of circuits includes capacitor 14, source winding 17 and diode 20. A second circuit includes capacitor 15, source output winding 18 and diode 21. A common load, resistor 22 and filter capacitor 23, is connected with the two circuits at the junction of diodes 20 and 21 and is returned to the common plate 13 of differential capacitor 10. which point may also be connected with a suitable electrical reference as ground 25.

Diodes 20 and 21 are poled so that they pass current to load resistor 22 in opposite directions. The output windings 17 and 18 of the alternating current source are phased as indicated by the dots on the diagram so that the first and second circuits conduct at the same time, during one half-cycle of the period of the source. The output windings 17 and 18 usually have equal voltages. The current through the first circuit, indicated by arrow $I_{D20}$ has an amplitude determined by the magnitude of capacitor 14, while the circuit current through the second circuit, $I_{D21}$, is determined by the magnitude of capacitor 15. The two currents are summed in load resistor 22 and the resultant current through the load represents the difference between or relative size of capacitors 14 and 15. On the half-cycle opposite from the half-cycle during which diodes 20 and 21 conduct, diodes 27 and 28 conduct, discharging capacitors 14 and 15 and recharging them in the opposite polarity in readiness for the succeeding half-cycle of operation.

In a representative circuit, the exciting signal from the alternating current source may have a frequency of the order of 8 to 10 megahertz. Each of the sections 14 and 15 of differential capacitor 10 has a nominal value of 30 picofarads with plate 13 centered. The values of load resistor 22 and of filter capacitor 23 are determined primarily by the output impedance and filter characteristics which are desired.

In a servoed measuring system, the output of the detector is used to drive the movable capacitor element 13 back to a nominal neutral position. Examples of systems of this character are found in the Jacobs, Thompson and Eide patents identified above. The driving or rebalancing current in a servoed system is a measure of the force being sensed. In a system of this character, the individual circuit currents are substantially equal and circulate through the capacitor and diode circuits with relatively little net current flowing through the load. As a result, the current in each of the individual circuits is determined primarily by the source voltage and the impedance of the sensing capacitor. The currents lead the applied voltage by substantially 90°.

Figure 2:
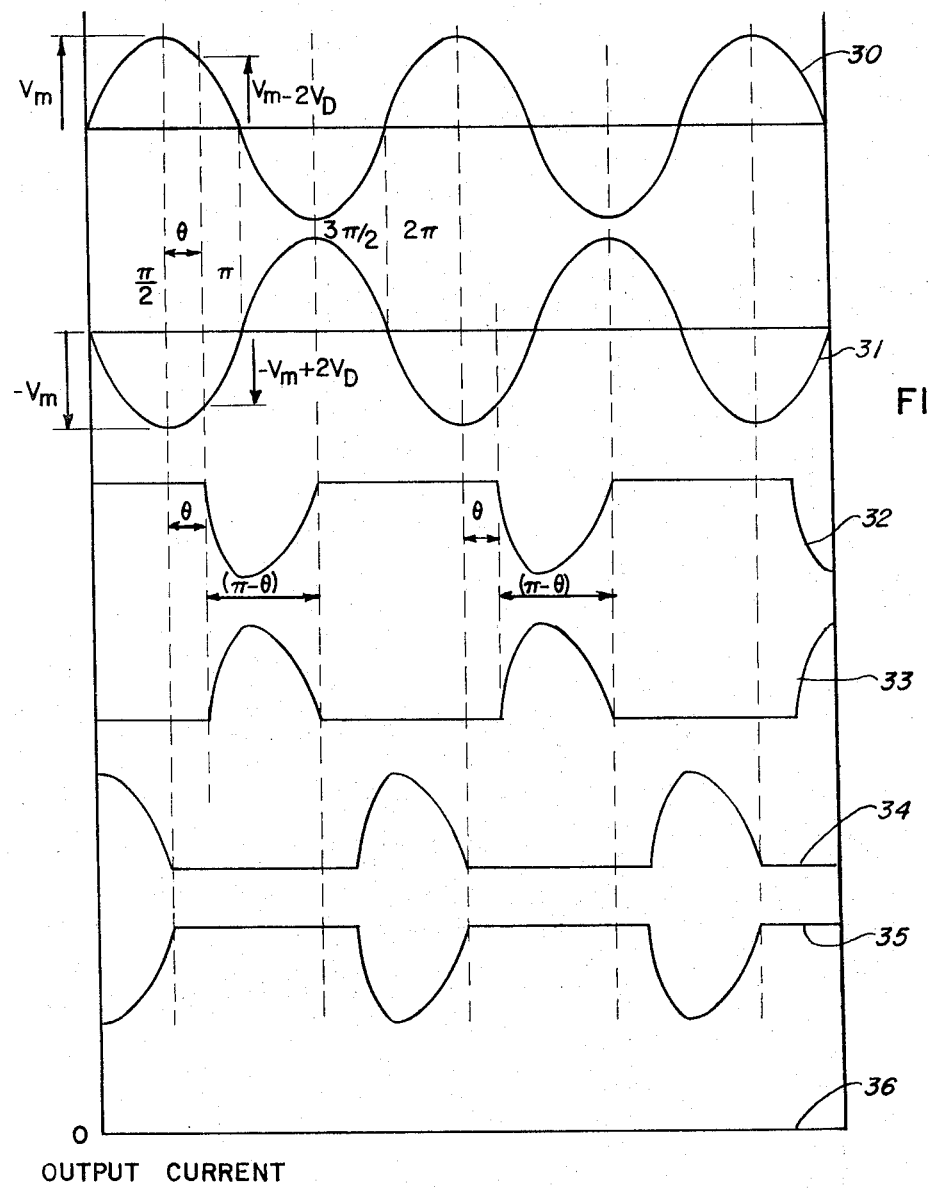
FIG. 2 is a series of voltage and current waveforms illustrating the operation of the circuit.

The current relationships are illustrated in FIG. 2, and represent a balanced condition in the circuit of FIG. 1. The voltage waveform 30, having a peak value $V_m$ from source winding 17 is applied to the circuit of capacitor 14. As the voltage at the end of winding 17 connected with capacitor plate 11 changes at a positive rate, the voltage of the terminal of winding 17 connected with the cathode of diode 20 becomes negative and current is conducted through diode 20 and the load circuit, charging capacitor 14. During the same period of time, source output winding 18 applies the opposite potential, waveform 31, to capacitor plate 12 and the anode of diode 21, causing the current to flow in the oppostie direction through the load, charging capacitor 15. During the other half-cycles of the source, diodes 27 and 28 conduct and the voltages on capacitors 14 and 15 are reversed. The current during this half-cycle does not flow through the load.

Curves 30 and 31 represent applied voltage plotted as a function of time and having an identical peak amplitude, $V_m$. The currents are capacitive and lead the voltage by 90°. Thus, as voltage waveform 30 passes a positive peak and begins to decrease, diode 20 is biased into conduction. Waveform 32 represents the current which flows in the circuit of diode 20. The start of the conduction of diode 20 is delayed until the voltage decreases by an amount equal to two forward diode drops, represented by the angle $\theta$. The angle of current conduction is then $\pi-\theta$ during each half-cycle.

Similarly, waveform 33 represents the current through diode 21. Current waveforms 34 and 35 represent the currents flowing through diodes 27 and 28, respectively, during the half-cycle of the source opposite that for conduction through load resistor 22. With the balanced condition hypothesized for the waveforms of FIG. 2, the net load current, waveform 36, is zero.

The principal source of error in prior circuits results from the fact that the different portions of the circuit conduct at different times during the period of the exciting current. Any difference in the wave shape of the exciting currents during these different times, as from even harmonic distortion, causes a difference in the currents which is not a result of an unbalance in the impedance elements being measured. As the output of the detector is a small signal established as the difference of two large signals, even a small nonsymmetrical distortion in the exciting current has s significant effect on the output. It is extremely difficult to design an oscillator which maintains exact symmetry in its waveform over a wide range of temperatures and which is not subject to the development of distortion as circuit components age.

With the circuit disclosed herein the exciting currents from source windings 17 and 18 are exact complements of each other. Thus, the principal source of error is eliminated.

A second source of error results from an unbalance or difference in the forward voltage drop of the diodes 20, 21, 27, 28. With most semiconductor diodes the forward junction potential has a large negative temperature coefficient. In other circuits where the diodes are not selected for matching temperature coefficients, the stability of the circuit is affected by temperature. Here, however, the only effect of the diode voltage drop is on the conduction angle of the two circuits. The angle $\theta$ is usually less than 10° and, as the sine changes very slowly in the vicinity of the voltage peak the current is small and any difference in diode voltage drops has little effect on the resultant current. The error resulting therefrom is significantly less than with prior circuits.

The output voltage of the circuit of FIG. 1 may be expressed in terms of the other circuit parameters as $$E_0 = 2V_m f R_L \Delta C.$$

Where
$E_0$ is the output voltage
$V_m$ is the peak value of the voltage
$f$ is the frequency
$R_L$ is the load resistance
$\Delta C$ is the difference between capacitors 14 and 15.
The gain is relatively high in terms of voltage output for a displacement of the capacitor from the balanced condition, as compared with prior circuits. This characteristic is significant since offset errors in circuits connected with the output of the detector (as a servo amplifier) are reduced in proportion to the gain of the detector circuit. Where the gain is high, a less expensive amplifier may be used.

FIG. 3 illustrates a modification of the circuit of FIG. 2 in which the gain is doubled. Elements of the circuit of FIG. 3 which are the same as those in FIG. 1 are identified by the same reference numeral and will not again be described in detail. The circuit of FIG. 3 differs from that of FIG. 1 in the addition of a second load, resistor 40 and capacitor 41, connected from the junction of diodes 27, 28 to ground 25. The currents $I_{D27}$ and $I_{D28}$, which occur during the half-cycle when diodes 20, 21 are back biased, flow through and are summed in resistor 40. The voltage across resistor 40 is symmetrical with, but opposite in sign to the voltage across load resistor 22. In FIG. 3 the output is obtained across both load resistors 22 and 40, providing a signal which is balanced with respect to ground and has twice the magnitude of the output of the circuit of FIG. 1.

The balanced differential output of FIG. 3 is particularly suited for input to a differential operational amplifier as shown in FIG. 4. Again, elements described in FIGS. 1 and 3 will be identified by the same reference numerals, but will not be described in detail. Oscillator 44 which provides the exciting signal for the detector has an output transformer 45 for which windings 17 and 18 form the secondary. The differential output developed across load resistors 22 and 40 is connected through series resistors 47, 58 with the inputs of a differential operational amplifier 49. The voltage output of the amplifier appears across terminals 50, 51.

In a servoed measuring system, an output of amplifier 49 is connected through a suitable feedback means, indicated schematically by broken line 52 with movable capacitor plate 13 to maintain it at its balanced position. Suitable torquing feedback mechanisms are illustrated in the patents of Jacobs, Thompson and Eide, identified above, for an accelerometer instrument.

The physical relationship of the windings of oscillator output transformer 45 have an effect on the balance of the system which is particularly apparent when operating at frequencies where distributed capacity in the transformer is significant in comparison with the impedances in the detecting circuit. The primary winding of the transformer 45, as is typical in an oscillator, has two sections 55, 56 with an intermediate tap 57 which is grounded. The feedback section 56 of the winding may have a turns ratio of 1:10 with section 55. In the transformer primary the maximum rate of change of voltage occurs at the upper teminal 59 of section 55 of the primary winding. The distributed capacity from this terminal to the terminals of the secondary windings affect the circuit operation.

Consider a transformer as illustrated in FIG. 5 with a toroidal core 62. The primary winding sections 55, 56 occupy approximately one-half the core. If the secondary windings 17, 18 were bifilar wound, the usual practice where identity of outputs is desired, the end of one secondary winding which is physically adjacent terminal 59 of the primary is connected with a section of the differential sensing capacitor 10 while the corresponding end of the other secondary winding is connected with the diode bridge circuit. These distributed capacities are indicated in broken lines at 63, 64, FIG. 4. The distributed capacities represented by 63, 64 are substantially equal, but the impedance to ground through the section of the differential capacitor is of the order of ten times as great as the impedance to ground through the diode bridge and load, represented in broken lines as 65. This results in unbalanced voltages being coupled into the secondary circuits through the distributed capacities 63, 64. The balance may be partially compensated by adding balancing elements to the circuit. This is a very unsatisfactory solution because true balance cannot be achieved, and the balancing procedure required is expensive.

If, however, the secondary windings 17 and 18 are wound separately on the core 72 and in opposite directions, with one of the windings overlying the other, the unbalance is eliminated. The secondary windings are physically balanced with respect to the primary winding, as by making the spacing between each secondary and the primary the same. The physical relationship of the secondary windings is illustrated diagrammatically in FIG. 5 where, for example, the coil 17 is shown with a line of one weight and coil 18 with a line of another weight in order that they may visually be differentiated. The coil 17 is wound with the same sense as primary winding section 55 while coil 18 is wound with the opposite sense. Now, the distributed capacity from terminal 59 to winding 18 is represented at 68, FIG. 4, to the terminal of winding 18 which is connected with the diode bridge and load, as is distributed capacity 64, associated with winding 17. The impedance 66 at this point is substantially equal to impedance 65 and the currents resulting from the distributed capacity do not unbalance the circuit.

We claim:

1. A circuit for detecting the difference of the values of two impedance elements, comprising:
    an alternating current source having two outputs of opposite phase;
    a pair of circuits, one connected with each of said source outputs;
    a current limiting impedance element in each circuit, at least one of the elements being variable;
    a pair of diodes, one in each circuit, poled to conduct opposite phase currents simultaneously during one half-cycle of the period of said alternating current source; and
    a common load connected with said circuits, said opposite phase currents being summed in said load, the load current magnitude representing the difference of the values of said impedance elements.

2. The detector circuit of claim 1 in which said alternating current source includes a transformer having two secondary windings, one providing each of the source outputs.

3. The detector circuit of claim 2 in which said transformer has a primary winding and the secondary windings are reversely wound, and physically balanced with resect to the primary winding.

4. The detector circuit of claim 1 in which said impedance elements are reactive, said detector circuit further including a second pair of diodes connected with said source and said impedance elements and conductive during the half-cycle of the period of said source opposite from said one half-cycle during which current is conducted through said load.

5. The detector circuit of claim 4 in which said reactive impedance elements are capacitors.

6. The detector circuit of claim 5 in which said capacitors are the two sections of a differential capacitor.

7. The detector circuit of claim 6 in which the two sections of the differential capacitor are connected, one with each of the outputs of said source, said differential capacitor having a common terminal connected with said load to complete said pair of circuits.

8. The detector circuit of claim 1 in which said detector circuit further includes a second pair of diodes connected with said source and said impedance elements and conductive during the half-cycle of the period of said source opposite from said one half-cycle through which current is conducted during said load, a second load connected with said second pair of diodes, and an output circuit connected across both loads.

9. The detector circuit of claim 4 in which said load is resistive, the time constant of the circuit of each of the reactive impedance elements and said load being less than the period of said alternating current source.

* * * * *